US011801803B2

(12) United States Patent
Santín Navarro

(10) Patent No.: US 11,801,803 B2
(45) Date of Patent: Oct. 31, 2023

(54) METHOD OF FOLDING AN AIRBAG

(71) Applicant: Dalphi Metal Espana S.A., Vigo (ES)

(72) Inventor: Pedro José Santín Navarro, Vigo (ES)

(73) Assignee: Dalphi Metal Espana, S.A., Vigo (ES)

( * ) Notice: Subject to any disclaimer, the term of this patent is extended or adjusted under 35 U.S.C. 154(b) by 19 days.

(21) Appl. No.: 17/626,682

(22) PCT Filed: Jul. 8, 2020

(86) PCT No.: PCT/EP2020/069284
§ 371 (c)(1),
(2) Date: Jan. 12, 2022

(87) PCT Pub. No.: WO2021/008975
PCT Pub. Date: Jan. 21, 2021

(65) Prior Publication Data
US 2022/0388474 A1     Dec. 8, 2022

(30) Foreign Application Priority Data

Jul. 12, 2019   (DE) .......................... 102019118975.6

(51) Int. Cl.
*B60R 21/237*  (2006.01)
*B60R 21/232*  (2011.01)

(52) U.S. Cl.
CPC .......... *B60R 21/237* (2013.01); *B60R 21/232* (2013.01)

(58) Field of Classification Search
CPC ............................. B60R 21/237; B60R 21/232
USPC ...................................................... 280/730.2
See application file for complete search history.

(56) References Cited

U.S. PATENT DOCUMENTS

| 5,865,462 | A  | * | 2/1999  | Robins   | B60R 21/2338 |
|           |    |   |         |          | 280/730.2    |
| 6,565,118 | B2 | * | 5/2003  | Bakhsh   | B60R 21/232  |
|           |    |   |         |          | 280/730.2    |
| 9,487,178 | B2 | * | 11/2016 | Kawamura | B60R 21/232  |
| 2012/0139215 | A1 | * | 6/2012  | Heuschmid | B60R 21/233 |
|           |    |   |         |          | 280/730.2    |
| 2014/0001737 | A1 |   | 1/2014  | Feller   |              |
| 2016/0039383 | A1 | * | 2/2016  | Hicken   | B60R 21/232  |
|           |    |   |         |          | 280/729      |
| 2016/0297394 | A1 | * | 10/2016 | Fujiwara | B60R 21/232  |
| 2017/0182967 | A1 | * | 6/2017  | Suzuki   | B60R 21/213  |

(Continued)

FOREIGN PATENT DOCUMENTS

| DE | 10361372 A1    | 7/2004  |
| DE | 102005020047 A1 | 11/2006 |
| DE | 102010051796 A1 | 5/2012  |

(Continued)

OTHER PUBLICATIONS

International Search Report and Written Opinion for PCT/EP2020/069284 dated Aug. 28, 2020 (9 pages; with English translation).

*Primary Examiner* — Keith J Frisby
(74) *Attorney, Agent, or Firm* — Kristin L. Murphy

(57) ABSTRACT

In a method of folding a curtain-type side airbag to form an elongate airbag package which defines a longitudinal direction, in one folding step at least portions of the side airbag are rolled around a first winding axis. In another folding step, at least portions of the side airbag are rolled around a second winding axis which is at an angle between 0° and 180° with the first winding axis.

19 Claims, 2 Drawing Sheets

(56) References Cited

U.S. PATENT DOCUMENTS

2017/0369024 A1* 12/2017 Ikenohata ............ B60R 21/2338
2021/0261087 A1*  8/2021 Wang .................... B60R 21/237

FOREIGN PATENT DOCUMENTS

| DE | 102014212238 A1 | 12/2015 |
|----|-----------------|---------|
| WO | 2018/134113 A1  | 7/2018  |

* cited by examiner

METHOD OF FOLDING AN AIRBAG

CROSS-REFERENCE TO RELATED APPLICATIONS

This application is a national stage of International Application No. PCT/EP2020/069284, filed Jul. 8, 2020, the disclosure of which is incorporated herein by reference in its entirety, and which claimed priority to German Patent Application No. 102019118975.6, filed Jul. 12, 2019, the disclosure of which is incorporated herein by reference in its entirety.

TECHNICAL FIELD

The disclosure relates to a method of folding a curtain-type side airbag.

BACKGROUND

Curtain-type side airbags are mounted on a roof rail of a passenger car to help protect against side impact. They may extend substantially along the entire side of the vehicle from the A-pillar to the C-pillar or else a portion therebetween.

In order to cover, for example, the C-pillar rearward of the vehicle occupants in the backseat, side airbags are known which, in the inflated state, include a freely suspended end portion that is not directly fixed to the vehicle. Said end portion is folded together with the remaining airbag and will be deployed and brought to its final position by the inflowing filling gas.

SUMMARY

What is needed is an airbag arrangement that is designed to ensure quick and reproducible deployment to the final position in such a side airbag.

A method of folding a curtain-type side airbag to form an elongate airbag package is disclosed herein, the folded elongated non-mounted airbag package defining a longitudinal direction. In a folding step, at least portions of the side airbag are rolled around a first winding axis. In another folding step, at least portions of the side airbag are rolled around a second winding axis that is at an angle between 0° and 180° with the first winding axis. In one exemplary arrangement, the second winding axis is at an angle between 20° and 160° with the first winding axis. Portions that are rolled around a winding axis unwind in a direction which is substantially perpendicular to said winding axis. Rolling the side airbag around two differently aligned winding axes results in the side airbag unwinding, during filling, in two different directions corresponding to the winding axes. In this way, the side airbag can be folded so that it is held in a small compact airbag package which, when filling the side airbag, deploys and, resp., unwinds especially simultaneously specifically into plural directions. Through this, the time during which the side airbag deploys into its final position can be reduced. Moreover, in this way it can be ensured that the side airbag can deploy without being obstructed e.g. by vehicle parts.

The rolling of airbags is covered by the generic term of folding, wherein not each folding procedure is a rolling procedure, of course.

According to one exemplary arrangement, the angle between the first winding axis and the second winding axis ranges from 30° to 90° thereby the orientations of the two winding axes, and thus the directions in which the side airbag unwinds, being substantially different from each other. In one exemplary arrangement, the angle between the first winding axis and the second winding axis ranges from 45° to 60°. Thus, especially quick deployment of the side airbag to the final position can be safeguarded.

The first winding axis may extend in parallel to the longitudinal direction, which allows the side airbag to be combined into an especially compact airbag package.

In accordance with another exemplary arrangement, the side airbag has an inflatable first portion and an inflatable second portion, the first portion being rolled around the first winding axis and the second portion being rolled around the second winding axis. In this manner, the side airbag can be folded so that, when filling the side airbag, each of the two portions unwinds and deploys specifically in an individual direction. Thus, the individual time required for the corresponding portion to provide its protective function at an intended location within the vehicle can be reduced.

Here, it may be provided that the first portion is not rolled around the second winding axis and/or that the second portion is not rolled around the first winding axis. In other words, the first portion may be provided to be rolled only around the first winding axis and/or the second portion may be provided to be rolled only around the second winding axis. This is to say that the portions are not rolled around plural winding axes having different orientations.

Further, the second portion may be provided at a longitudinal end of the side airbag, especially the longitudinal end of the side airbag which is associated with a vehicle tail. In this way, the second portion can be provided within especially short time in an area separate from the first portion, for example between the B-pillar and the C-pillar, while the first portion is provided between the A-pillar and the B-pillar, In one exemplary arrangement, at least portions of the side airbag are folded in another folding step, especially after rolling around the first winding axis and/or the second winding axis. In accordance with the disclosure, the term folding also covers turning over and/or folding up the side airbag and resp., portions thereof. Accordingly, the side airbag can be folded in an especially compact manner.

In another exemplary arrangement, each of the first portion and the second portion includes a cushion-type compartment which are fluid-connected to each other via a connecting channel. In this way, the two compartments can be filled with filling gas via a joint port.

Here, the connecting channel may be provided, in the mounted deployed state, at the upper edge of the side airbag extending in the longitudinal direction. The upper edge of the side airbag especially constitutes the area of the side airbag in which a port for filling the side airbag with filling gas is provided. This configuration ensures the filling gas to be directed via the connecting channel to the two portions immediately after the filling of the side airbag with filling gas is started.

Accordingly, it is of advantage when the side airbag is rolled and/or folded so that the connecting channel remains capable of being partly filled with filling gas in order to enable filling gas to quickly flow into all inflatable parts of the side airbag when the airbag is being filled.

According to one exemplary arrangement, in another folding step at least portions of the side airbag are rolled around a third winding axis which is at an angle between 0° and 180° with the first winding axis. In this manner, the side airbag can unroll during filling corresponding to the winding axes into three different directions, thus allowing reliable deployment to be quickly effectuated even in the case of a complex geometry.

Here, the side airbag can have a third inflatable portion which is rolled around the third winding axis. Thus, the side airbag can be folded so that, while the airbag is filled, each of all three portions unwinds and deploys specifically into an individual direction.

Especially the third portion may be provided opposite to the second portion at a second longitudinal end of the side airbag so that there can be provided one portion in the longitudinal direction forward of and one portion rearward of the central second portion within the vehicle, each of said portions unrolling in an individual direction when the side airbag is filled.

The folding steps may be carried out in any order and/or at least partially simultaneously. In this application, partly folding steps are marked by "first", "second", "third" etc., which merely is done for improving clarity and does not imply any chronological order.

BRIEF DESCRIPTION OF DRAWINGS

Hereinafter the disclosure shall be described in detail by way of an example arrangement with reference to the attached drawings, wherein.

DETAILED DESCRIPTION

Figure 1:
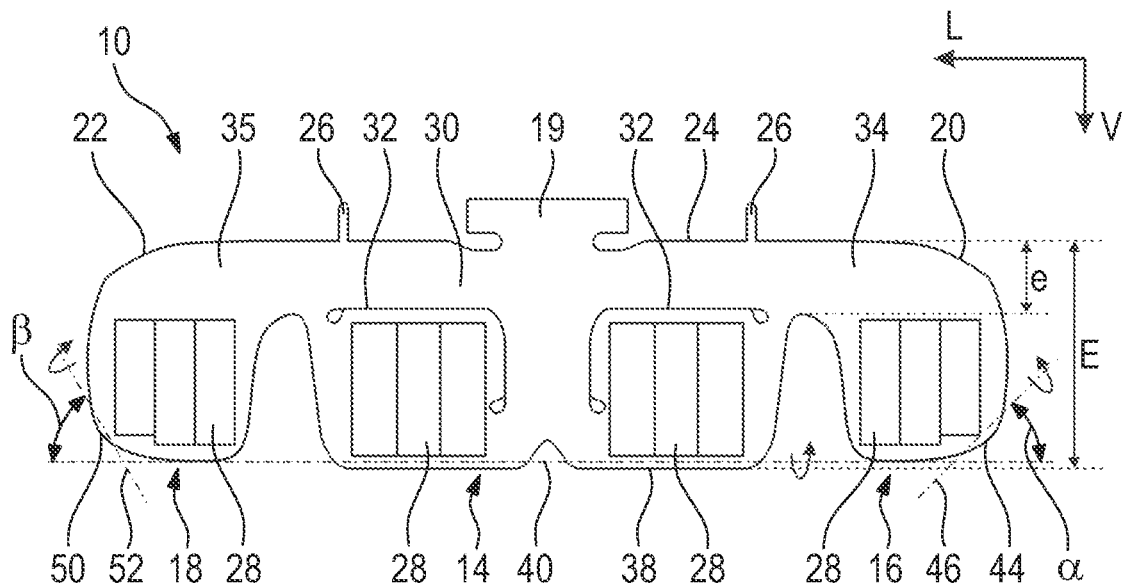
FIG. 1 shows a side airbag having three portions in a schematic view in a completely flatly spread state.
Figure 2:
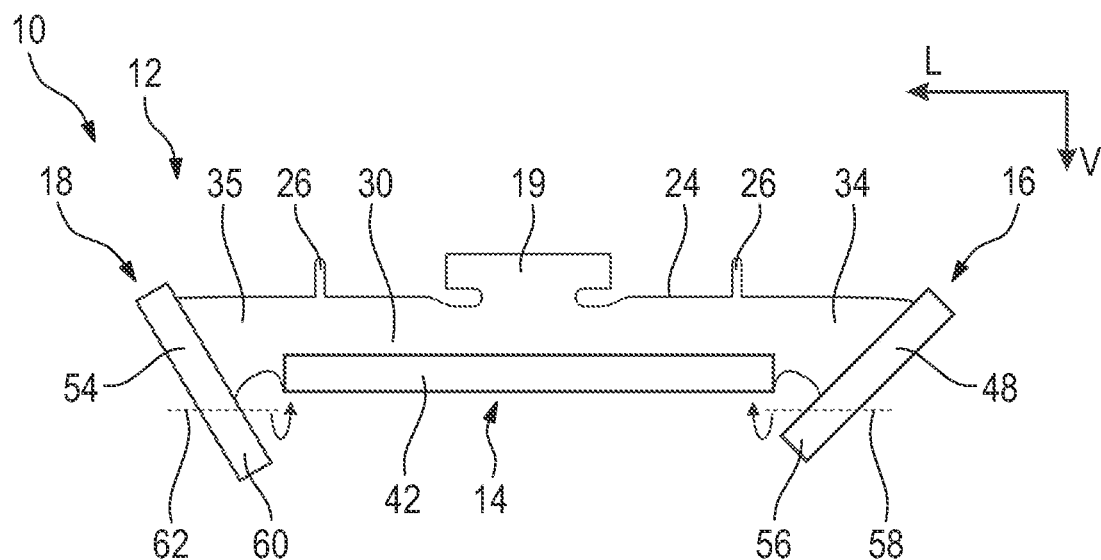
FIG. 2 shows the side airbag of FIG. 1, after each of the portions has been rolled in a folding step around a corresponding winding axis.
Figure 3:
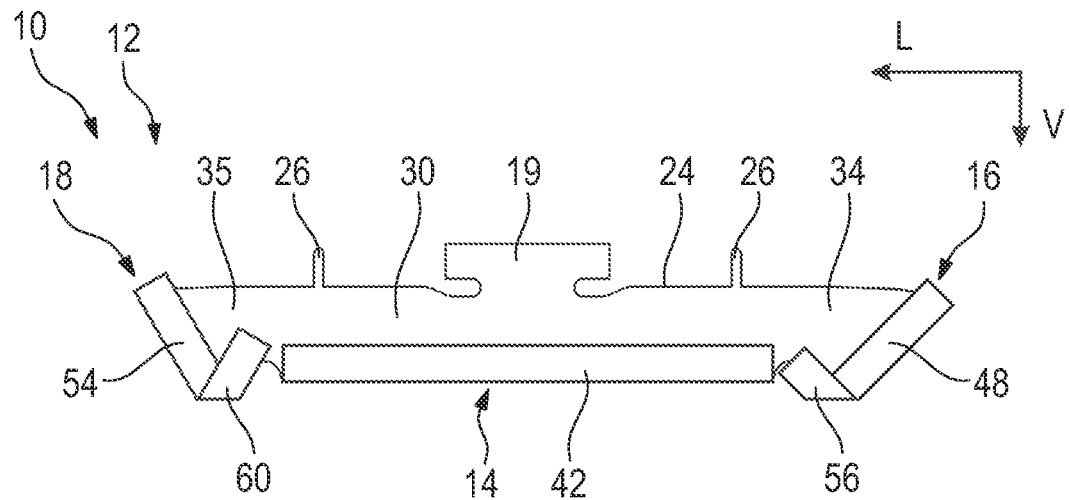
FIG. 3 shows the side airbag of FIG. 2 after another folding step.

FIGS. 1 to 3 represent successive folding steps in a method of folding a side curtain airbag 10.

The side airbag 10 is arranged, prior to its deployment and filling, at a roof rail of a passenger car, namely in the form of a folded airbag package 12 as schematically shown in FIG. 3. The side airbag 10 can extend, in the filled state, over one or more of the vehicle pillars and can reach, for example, from the A-pillar to the C-pillar.

FIG. 1 shows the side airbag 10 in a non-filled and flatly spread state.

The side airbag 10 has an inner first portion 14 as well as an outer second portion 16 and an outer third portion 18 which are provided at opposed longitudinal ends 20, 22 of the side airbag 10 and abut on the first portion 14.

A longitudinal direction L is defined here by the longitudinal direction of the completely folded, stretched and non-mounted airbag package 12 in FIG. 3 and extends at least approximately in parallel to an upper edge 24 of the mounted inflated side airbag 10. The upper edge 24 naturally follows, to a certain extent, the contour of a roof rail on which the airbag package 12 is finally mounted, and, in addition, includes certain steps, for example due to an inflation mouth 19 to which a gas generator (not shown) is connected that supplies the filling gas required for inflation. Nevertheless, the upper edge 24 of the side airbag 10 at least approximately predefines a continuous direction.

In the exemplary arrangement, the longitudinal direction L points to the direction of a primary driving direction of the vehicle, i.e. it points to the front end of the vehicle.

Along the upper edge 24, plural fastening portions 26 are formed through which the side airbag 10 is tightly connected to the vehicle and which remain tightly connected to the vehicle even in the inflated and deployed state. Said fastening portions 26 protrude even from the completely folded airbag package 12 so that the airbag package 12 can be fastened (cf. FIG. 3, for example).

In one exemplary arrangement, the lug-type fastening portions 26 are one-piece extensions of the airbag made from the material of the latter.

At the second and third portions 16, 18 no fastening portions 26 are provided so that said portions 16, 18 can be folded and/or wound up over their entire surface and in any way, especially along the upper edge 24. That is to say, the fastening portions 26 present at the first portion 14 do not obstruct the folding and, resp., the rolling of the second and third portions 16, 18.

In an alternative exemplary arrangement, fastening portions 26 may be provided at any locations, thereby ensuring especially safe fastening of the side airbag 10.

Each of the portions 14, 16, 18 includes plural inflatable cushion-type compartments 28 which are fluid-connected to each other via a connecting channel 30 which may extend along the entire upper edge 24 or portions of the upper edge 24 of the side airbag 10 and which serves for distributing the filling gas flowing in through the inflation mouth 19.

The first portion 14 is additionally subdivided by non-inflatable partitions 32, as this is conventionally known.

As a matter of course, in an alternative exemplary arrangement each portion 14, 16, 18 can include any number of cushion-type compartments 28, however each can include at least one.

In addition, or as an alternative, any number of the portions 14, 16, 18 can be subdivided by any number of non-inflatable partitions 32.

Each of the second portion 16 and the third portion 18 has a transition portion 34, 35 via which they are connected to the first portion 14. The transition portions 34, 35 are hose-shaped and have a significantly smaller extension e in a vertical direction V perpendicularly to the longitudinal direction L than the first portion 14.

In one exemplary arrangement, the extension e in the vertical direction V of the transition portions 34, 35 amounts to a maximum of 50% of the extension E in the vertical direction V of the first portion 14, thus allowing more degrees of freedom for folding, especially winding up the second portion 16 and the third portion 18 independently of the first portion 14. In this manner, folding of the airbag 10 with respect to the direction and the velocity during deployment as well as with respect to the compactness of the airbag package 12 can be further optimized.

In another alternative arrangement, the second and third portions 16, 18 may include no transition portions 34, 35 and may abut on the first portion 14 especially along the entire width in the vertical direction V.

The portions 14, 16, 18 are designed as curtain-type portions extending in the vertical direction V in the inflated state. For example, the first portion 14 is provided in the area of the side window and of the B-pillar inside the vehicle. The second portion 16 associated with the vehicle tail may be provided here for the side window between the B-pillar and the C-pillar inside the vehicle. The third portion 18 associated with the vehicle front end may be used, for example, to cover portions of an A-pillar of the vehicle and/or at least portions of the windscreen inside the vehicle.

Basically, each of the portions 14, 16, 18 may be provided for any areas inside the vehicle.

In the exemplary arrangement shown in FIG. 1, the side airbag 10 is configured to be mirror-inverted. As a matter of course, the side airbag 10 may be configured as any alternative arrangement, especially with the design being adapted to the safety requirements and/or to the vehicle for which the side airbag 10 is provided.

In another alternative arrangement, the side airbag 10 may have any number of portions 14, 16, 18, wherein not all portions 14, 16, 18 are required to abut on a joint portion 14, 16, 18, but the portions 14, 16, 18 form a row, for example, in which each portion 14, 16, 18 is adjacent to one or two portions 14, 16, 18.

In one exemplary arrangement, the side airbag 10 does not include a third portion 18 but merely the first portion 14 and the second portion 16.

In order to fold the side airbag 10 into the airbag package 12 shown in FIG. 3, plural successive folding steps are carried out. The folding steps described here for folding the side airbag 10 may be carried out in any order at a skilled person's discretion. The method of folding the side airbag 10 shall be described as follows by way of the FIGS. 1 to 3 and the exemplary arrangement of the side airbag 10 illustrated there.

In a first folding step, the first portion 14, starting with a first end 38 opposed to the upper edge 24, is rolled around a first winding axis 40 to form a first roll 42 (see FIG. 2).

Here, the first winding axis 40 extends in parallel to the longitudinal direction L.

As a matter of course, the first winding axis 40 may extend in any direction in an alternative exemplary arrangement.

The first portion 14 is not completely rolled up to the upper edge 24 so that the connecting portion 30 remains unwound at least in portions and thus is not completely part of the first roll 42.

In an alternative exemplary arrangement, the first portion 14 may be completely rolled up, especially for designing the airbag package 12 in an especially compact manner.

In a second folding step, the second portion 16 is rolled up, starting with a second end 44 of the second portion 16 arranged opposite to the transition portion 34 of the second portion 16, around a second winding axis 46 to form a second roll 48, The second winding axis 46 extends at an angle α of 45° with the first winding axis 40.

In an alternative exemplary arrangement, the angle α takes a value of more than 0° to a maximum of 180°, and in one exemplary arrangement, more than 20° and less than 160°. In another alternative exemplary arrangement, the angle α takes a value ranging from 30° to 90°, especially from 45° to 60°.

Ina third folding step, starting with a third end 50 of the third portion 18 arranged opposite to the transition portion 35 of the third portion 18, the third portion 18 is rolled up around a third winding axis 52 to form a third roll 54.

The third winding axis 52 extends at an angle β of 60° with the first winding axis 40.

In an alternative exemplary arrangement, the angle β takes a value of more than 0° to a maximum of 180°, and in one exemplary arrangement, more than 20° and less than 160°. In another alternative exemplary arrangement, the angle β takes an angle ranging from 30° to 90°, and in one exemplary arrangement, especially from 45° to 60°.

In a fourth folding step, the roll end 56 of the second roll 48 which is adjacent to the first portion 14 and distant from the upper edge 24 is folded over at a first folding line 58, as illustrated in FIGS. 2 and 3. The first folding line 58 extends in parallel to the longitudinal direction L.

In a fifth folding step, the roll end 60 of the third roll 54 which is adjacent to the first portion 14 and distant from the upper edge 24 is folded over at a second folding line 62 extending in parallel to the longitudinal direction L.

The folding lines 58, 62 may have any respective orientation in an alternative exemplary arrangement and/or may be arranged at any location.

In an alternative example arrangement, following the fifth folding step there may be provided a sixth folding step in which the first roll 42, the second roll 48 and the third roll 54 are wound, especially completely, around the first winding axis 40 further toward the upper edge 24, in particular to render the airbag package 12 especially compact. In one exemplary arrangement, in the sixth folding step the airbag package 12 is rolled up only so far that still it is possible to quickly fill at least portions of the connecting channel 30.

Basically, the method may include, in addition to the first and second folding steps, i.e. the winding of the side airbag 10 around the first and second winding axes 40, 46, any number of folding steps that are adapted especially to the configuration of the &de airbag 10 as well as to the requirements made to the airbag package 12. In particular, in a side airbag 10 having no third portion 18 the third and fifth folding steps are omitted.

One example arrangement may provide that the rolls 42, 48, 54 are not folded, especially not along a folding line 58, 62.

In addition to or as an alternative to the folding steps of the example arrangement, in an alternative arrangement the side airbag 10 can be folded at least in portions in any way, for example in zigzag or umbrella shape.

In this way, the side airbag 10 is folded into a compact airbag package 12 (see FIG. 3) in which at least portions of the connecting channel 30 remain adapted to be filled with filling gas, thus ensuring reliable and quick deployment of the side airbag 10.

Figure 4:
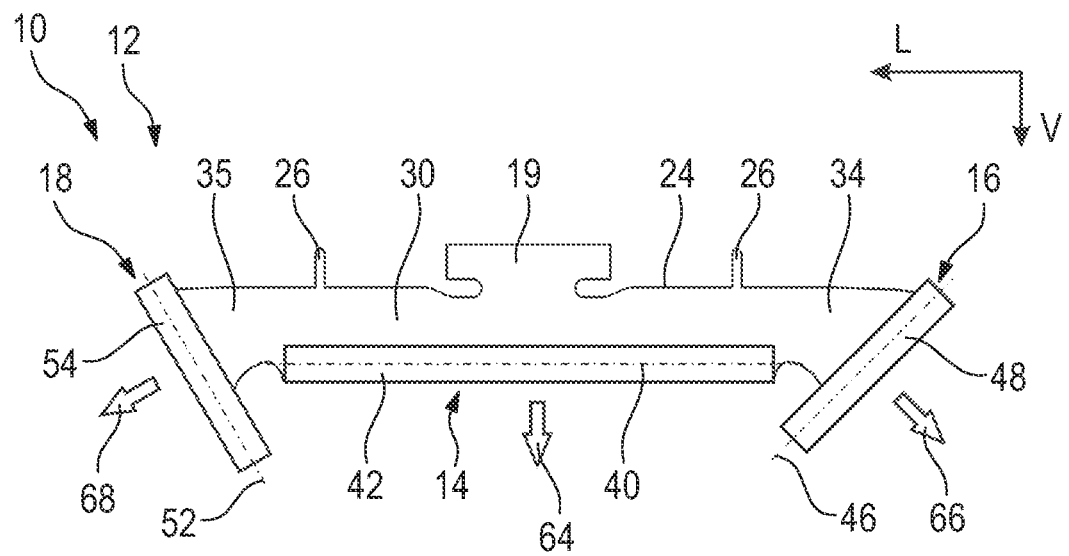
FIG. 4 shows the deployment behavior of the side airbag of FIG. 2.

When the side airbag 10 deploys (see FIG. 4), filling gas flows into the airbag package 12 through the inflation mouth 19 and spreads via the connecting channel 30 along the upper edge 24 of the side airbag 10 and ensures the portions 14, 16, 18 to deploy in a defined manner, each roll 42, 48, 54 unwinding perpendicularly to its winding axis 40, 46, 52.

In this manner, each of the individual portions 14, 16, 18 deploys in a separate direction 64, 66, 68 so that the portions 14, 16, 18 can especially quickly provide their protective function at the intended location within the vehicle and can pass seatbelts or headrests, for example, without being obstructed by the latter.

The disclosure is not limited to the illustrated arrangements. In particular, individual features of one arrangement may be combined at will with features of other arrangements irrespective of the other features of the corresponding arrangements.

The invention claimed is:

1. A method of folding a curtain side airbag to form an elongate airbag package which defines a longitudinal direction, wherein in one folding step at least portions of the side airbag are rolled around a first winding axis wherein in another folding step at least portions of the side airbag are rolled around a second winding axis which is at an angle between 30° to 90° with the first winding axis.

2. The method according to claim 1 wherein the first winding axis extends in parallel to the longitudinal direction.

3. The method according to claim 1, wherein the side airbag includes an inflatable first portion and an inflatable second portion, the first portion being rolled around the first winding axis and the second portion being rolled around the second winding axis.

4. The method according to claim 3, wherein the first portion is not rolled around the second winding axis and/or in that the second portion is not rolled around the first winding axis.

5. The method according to claim 4, wherein the second portion is provided at a longitudinal end of the side airbag.

6. The method according to claim 3, wherein the second portion is provided at a longitudinal end of the side airbag.

7. The method according to claim 1, wherein in another folding step at least portions of the side airbag are folded.

8. The method according to claim 1, further comprising first and second portions, wherein each of the first portion and the second portion has a cushion compartment which compartments are fluid-connected to each other via a connecting channel.

9. The method according to claim 8, wherein the side airbag at its upper edge includes the connecting channel which extends in the longitudinal direction.

10. The method according to claim 9 wherein the side airbag is rolled and/or folded so that the connecting channel remains adapted to be filled partially with gas.

11. The method according to claim 8 wherein the side airbag is rolled and/or folded so that the connecting channel remains adapted to be filled partially with gas.

12. The method according to claim 1, wherein in another folding step at least portions of the side airbag are rolled around a third winding axis which is at an angle between 0° to 180° with the first winding axis.

13. The method according to claim 12, wherein the side airbag-includes a third inflatable portion which is rolled around the third winding axis.

14. The method according to claim 1, wherein the angle between the first winding axis and the second winding axis amounts to 45° to 60°.

15. The method according to claim 1, wherein the first winding axis extends in parallel to the longitudinal direction.

16. The method according to claim 1 wherein the side airbag includes an inflatable first portion and an inflatable second portion, the first portion being rolled around the first winding axis and the second portion being rolled around the second winding axis.

17. The method according to claim 16, wherein in another folding step at least portions of the side airbag are folded.

18. The method according to claim 16, wherein each of the first portion and the second portion has a cushion compartment which compartments are fluid-connected to each other via a connecting channel.

19. The method according to claim 18, wherein in another folding step at least portions of the side airbag are rolled around a third winding axis which is at an angle between 0° to 180° with the first winding axis.

* * * * *